US011171985B1

(12) United States Patent
Agrawal et al.

(10) Patent No.: US 11,171,985 B1
(45) Date of Patent: Nov. 9, 2021

(54) SYSTEM AND METHOD TO DETECT LATERAL MOVEMENT OF RANSOMWARE BY DEPLOYING A SECURITY APPLIANCE OVER A SHARED NETWORK TO IMPLEMENT A DEFAULT GATEWAY WITH POINT-TO-POINT LINKS BETWEEN ENDPOINTS

(71) Applicant: Airgap Networks Inc., Santa Clara, CA (US)

(72) Inventors: Ritesh R. Agrawal, San Jose, CA (US); Vinay Adavi, Sunnyvale, CA (US); Satish M. Mohan, San Jose, CA (US)

(73) Assignee: AIRGAP NETWORKS, INC., Santa Clara, CA (US)

( * ) Notice: Subject to any disclaimer, the term of this patent is extended or adjusted under 35 U.S.C. 154(b) by 0 days.

(21) Appl. No.: 17/357,757

(22) Filed: Jun. 24, 2021

(51) Int. Cl.
*H04L 29/06* (2006.01)
*H04L 12/46* (2006.01)

(52) U.S. Cl.
CPC ...... *H04L 63/1466* (2013.01); *H04L 12/4641* (2013.01); *H04L 63/1416* (2013.01)

(58) Field of Classification Search
CPC ............. H04L 63/1466; H04L 12/4641; H04L 63/1416
See application file for complete search history.

(56) References Cited

U.S. PATENT DOCUMENTS

| | | | |
|---|---|---|---|
| 6,914,905 B1 * | 7/2005 | Yip | H04L 12/4641 370/395.53 |
| 8,055,800 B1 | 11/2011 | Bardzil et al. | |
| 9,602,529 B2 * | 3/2017 | Jones | G06F 21/577 |
| 11,093,139 B1 * | 8/2021 | Karr | G06F 3/0652 |
| 2017/0149775 A1 | 5/2017 | Bachar et al. | |
| 2021/0152595 A1 * | 5/2021 | Hansen | H04L 9/0894 |

OTHER PUBLICATIONS

Thapa, Manish, "Mitigating Threats in IoT Network Using Device Isolation", Master's Thesis, Feb. 4, 2018, 73 pgs.
International Search Report and Written Opinion for PCT/US2020/020593, dated Apr. 15, 2020, 8 pgs.
International Preliminary Report on Patentability for PCT/US2020/020593, Completed May 18, 2021, 8 pgs.

* cited by examiner

*Primary Examiner* — Arvin Eskandarnia
(74) *Attorney, Agent, or Firm* — Patent Law Works LLP

(57) ABSTRACT

A technique to stop lateral movement of ransomware between endpoints in a VLAN is disclosed. A security appliance is set as the default gateway for intra-LAN communication. Message traffic from compromised endpoints is detected. Attributes of ransomware may be detected in the message traffic, as well as attempts to circumvent the security appliance. Compromised devices may be quarantined.

21 Claims, 7 Drawing Sheets

SYSTEM AND METHOD TO DETECT LATERAL MOVEMENT OF RANSOMWARE BY DEPLOYING A SECURITY APPLIANCE OVER A SHARED NETWORK TO IMPLEMENT A DEFAULT GATEWAY WITH POINT-TO-POINT LINKS BETWEEN ENDPOINTS

FIELD OF THE INVENTION

The present disclosure generally relates to techniques for ransomware protection. More particularly, the present disclosure is related to providing lateral movement protection from Ransomware in environments such as shared VLAN environments.

BACKGROUND

Ransomware is one of the biggest threats facing the security industry today. Ransomware is a form of malware that infects computer systems. Ransomware is becoming an increasing problem in the computer/network security industry. Ransomware infects a computer system and encrypts files. A ransom is demanded in exchange for a decryption key.

Conventional enterprise security solutions have proved to be inadequate in view of the high profile ransomware cases of large companies such as the Colonial Pipeline ransomware attack in 2021. The inadequacy of conventional enterprise security solutions is also evidenced by the fact that in 2020 51% of surveyed companies were hit by ransomware attacks.

Firewalls provide inadequate protection against ransomware attacks. In some companies, separate Virtual Local Area Networks (VLANs) are used to segment sections of a company by division as an additional layer of protection. For example, a finance department may have a separate VLAN domain than an engineering department. Or a finance department may have a different VLAN domain than a marketing department. However, this sort of segmentation of VLAN domains by departments doesn't address the problem of lateral movement of Ransomware attacks within a VLAN domain.

One of the reasons for the inadequacy of current enterprise security solutions is the difficulty of protecting against ransomware attacks within a shared VLAN based network architecture. If a device that is part of a shared VLAN broadcast domain is infected by ransomware or malware, there are very few security controls that can be implemented to prevent lateral propagation of the ransomware within the same VLAN network.

Referring to FIG. 1, a firewall 110 provides some limited protection against external ransomware attacks. However, a VLAN network also has east-west communication between endpoint devices 120 in a shared VLAN domain that is forwarded directly by the network router/switch 140. This east-west Intra-LAN communication is not visible to the network firewall 110 deployed up-stream on the network as shown in FIG. 1.

Current security solutions for lateral propagation protection of ransomware are based on endpoint protection. The drawback of these approaches is that it relies on an agent deployed on each endpoint to detect malicious ransomware processes being launched. Deploying and managing these agents is a challenge for IT organizations, and furthermore they cannot be deployed on IoT devices (such as web cameras, printers, and other devices) and are frequently not supported on older versions of operating systems.

Conventional VLAN network architectures have a potential gap in protection associated with lateral movement of ransomware between endpoint devices. Software application on endpoint devices provides only limited protection due to a variety of practical problems in managing software apps on endpoint devices and the presence of other IoT devices at endpoint devices, such as web cameras, printers, etc. There is thus a potential for ransomware to enter the VLAN network and laterally propagate to endpoint devices.

SUMMARY

A technique to detect lateral propagation of ransomware between endpoints in a VLAN is disclosed. In one implementation, a smart appliance is deployed in an access port or a trunk port of VLAN network. The smart appliance is set as the default gateway for intra-LAN communication for two or more endpoint devices. Message traffic from compromised endpoints is detected.

Additional measures may also be taken to generate alerts or quarantine compromised end point devices.

An example of a computer-implemented method of ransomware protection in a Virtual Local Area Network (VLAN) includes deploying a security appliance in an access or a trunk port of a shared VLAN environment. A subnet mask of 255.255.255.255 is used to set the security appliance as a default gateway for a plurality of endpoint devices of the shared VLAN environment. The security appliance monitors intra-VLAN communication between the plurality of endpoint devices of the shared VLAN environment. The security appliance detects lateral propagation of ransomware between endpoint devices via intra-VLAN communication in the shared VLAN environment.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
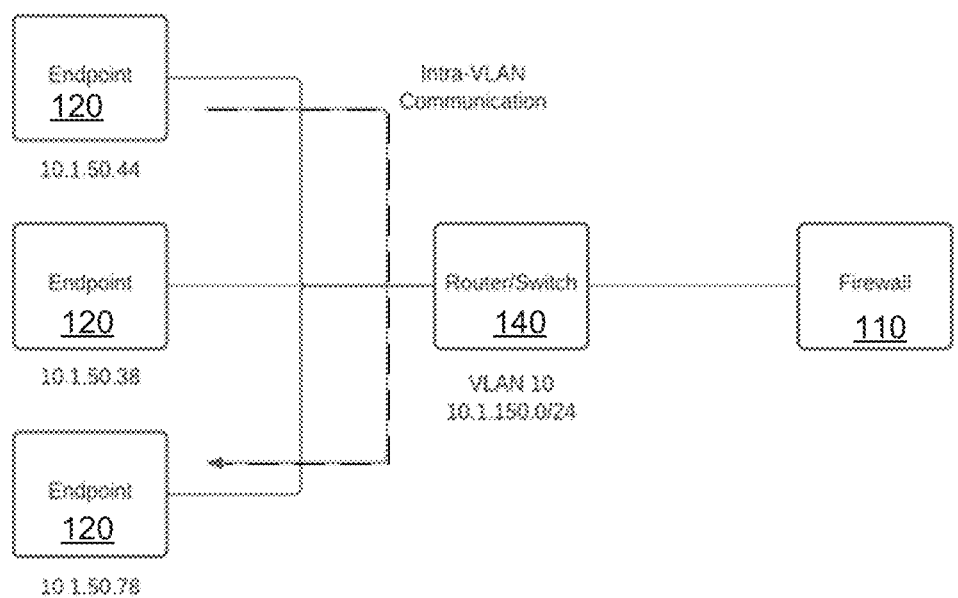
FIG. 1 is a block diagram illustrating Intra-LAN traffic in a conventional VLAN network.
Figure 2:
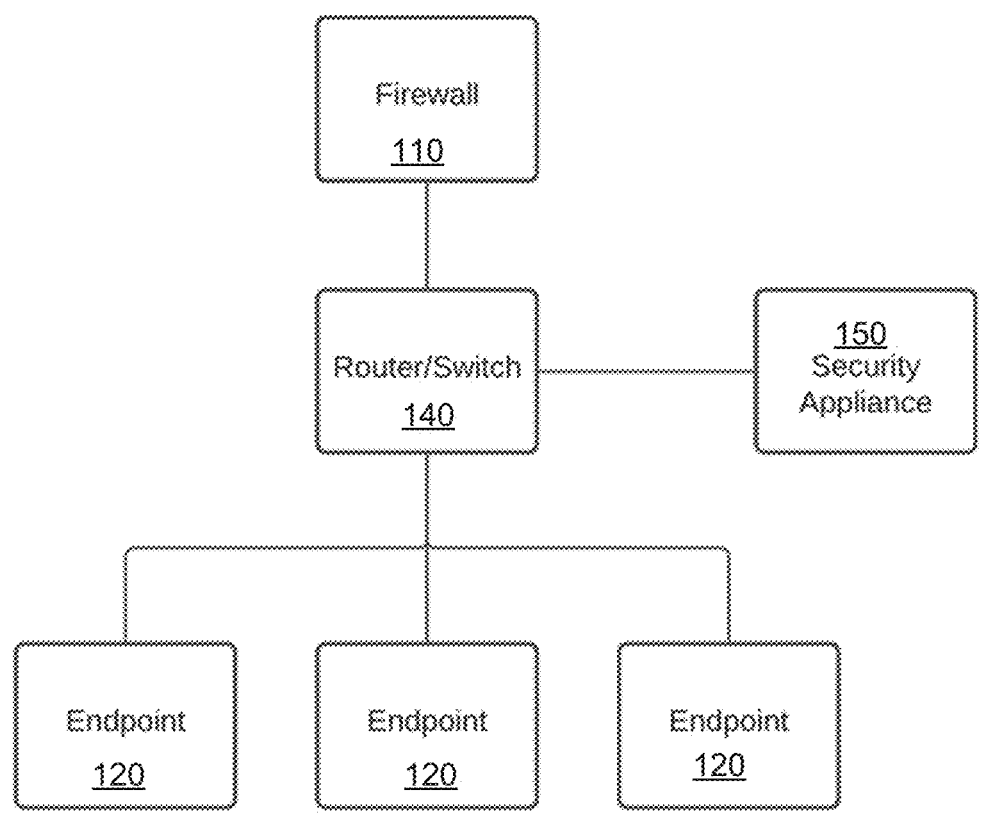
FIG. 2 is a block diagram illustrating a security appliance to provide protection from lateral movement of ransomware in accordance with an implementation.

FIG. 2 is a diagram illustrating a change to a network architecture to prevent lateral propagation of malware and ransomware. The operation of the network router/switch 140 is augmented and enhanced with a security appliance 150. The security appliance could be implemented in a variety of ways, such as using a mixture of hardware and software, firmware, etc. However, in one implementation it is implemented as software that may, for example, be stored on a memory and executed on a computer processor associated with a computing device such as the router/switch. In one implementation, it may be deployed on an existing port (e.g., an access port or a trunk port) of the VLAN network. As an illustrative example, the security application 150 may be implemented as software compatible with a virtual machine (VM) implementation, such as within a hypervisor implementation in VMware®. The security appliance may be deployed on a port that allows the security application to monitor and control the flow of message traffic across a network node for a plurality of endpoint devices with an individual VLAN domain or even across multiple VLAN domains. Deploying the security appliance on a trunk port is advantageous because a trunk port is a specific type of port on a network switch that allows data to flow across a network node for multiple virtual local area networks or VLANs. However, the security appliance could alternatively be deployed on an access port.

In one implementation, virtual point to point links between a security appliance 150 and each endpoint 120 are established in a shared VLAN domain that forces all traffic from an endpoint to traverse the security appliance 150. In one implementation, the security appliance is deployed on an access port or a trunk port on an existing router or switch.

In one implementation, the security appliance 150 becomes the default gateway and the Dynamic Host Configuration Protocol (DHCP) server responsible for dynamically assigning an IP address and other network configuration parameters to each endpoint device on the network so that they communicate with each other in the existing VLAN network.

When an individual endpoint 120 requests an IP address, the security appliance 150 responds back with an IP address and a subnet mask that sets the security appliance as the default gateway for the endpoint. In one implementation, the security appliance responds with a subnet comprised of all ones—255.255.255.255—that sets itself as the default gateway for the endpoint. Since the endpoint receives an IP address with a subnet mask of 255.255.255.255, any network communication with other endpoints or internet applications needs to be routed via the default gateway. In other words, a network with a subnet mask of 255.255. 255.255 puts each device inside its own subnet, which forces them to communicate with the default gateway before communicating with any other device. The 255.255. 255.255 subnet mask may also be referred to by the Classless Inter-Domain Routing (CIDR) prefix /32, which has 1 IP address. The CIDR number comes from the number of ones in the subnet mask when converted to binary. The 255.255.255.255 subnet mask corresponds to a CIDR prefix of /32.

Since the security appliance 150 sets itself as the default gateway for the network (by virtue of the subnet mask being comprised of all ones), any East-West communication between different endpoints 120 and communication between an endpoint 120 and other endpoints 120 or applications on different networks will be routed via it. This provides the security appliance with the unique ability to allow only authorized communication and disallow everything else.

Figure 3:
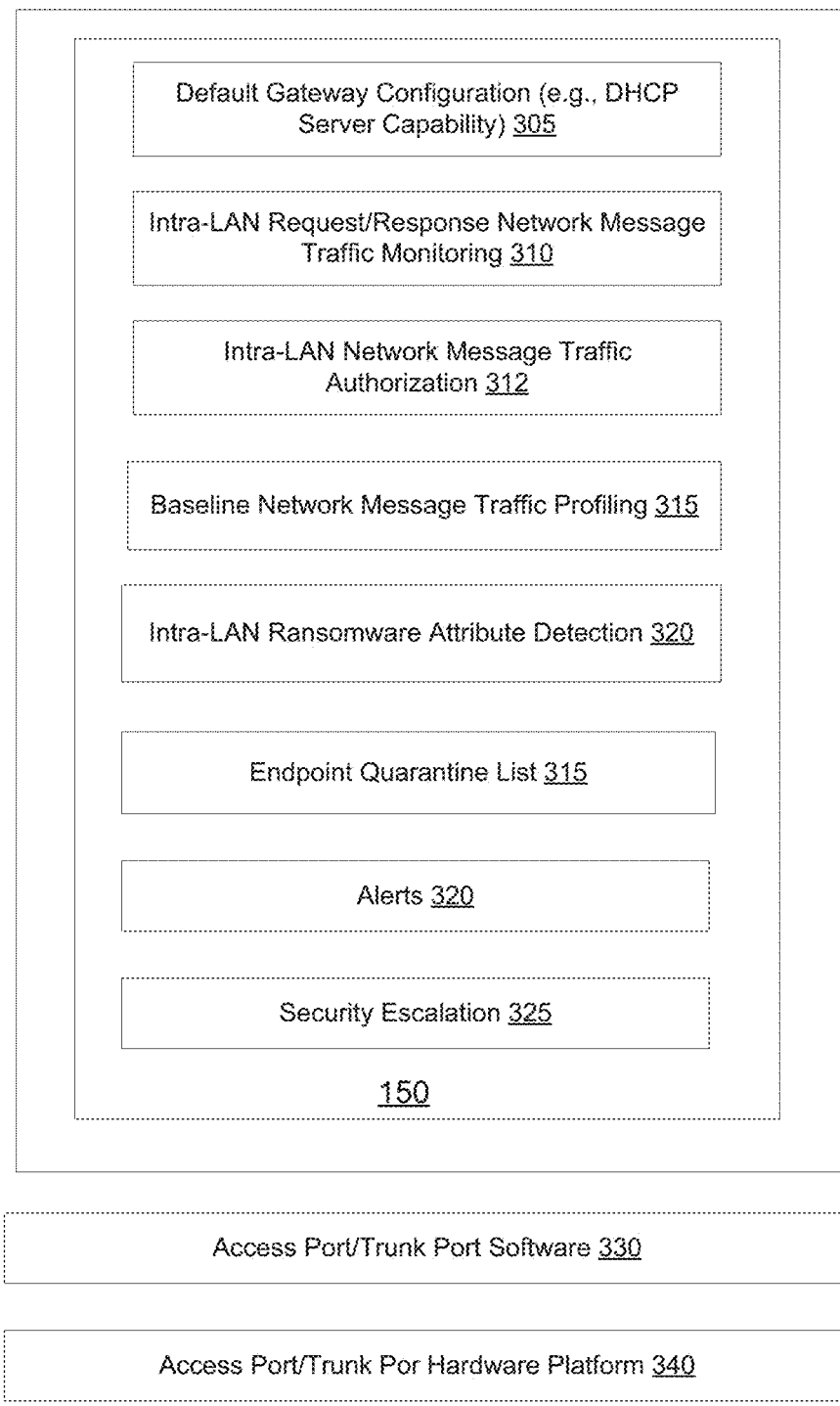
FIG. 3 is a block diagram illustrating components of a security appliance in accordance with an implementation.

FIG. 3 is a high-level diagram illustrating major functional blocks of the security appliance in one implementation. As previously discussed, the security appliance 150 may be deployed in an access port or in a trunk port associated with VLANs for a number of different endpoint devices (e.g., different laptop computers in a VLAN domain). It thus may by implemented as software stored on a computer memory and executable by a processor associated with an access port or a trunk port. For example, it may be implemented as software deployed with the software 330 and hardware 340 environment associated with an access port or a trunk port. In the example of FIG. 3, the security appliance 150 includes a default gateway configuration unit 305 to set the security appliance as a default gateway as described above (e.g., using a subnet mask of 255.255.255.255). An intra-LAN traffic monitoring unit 310 monitors intra-LAN traffic. This can include monitoring both request and response messages in intra-LAN traffic and detecting irregularities in intra-LAN request/response message traffic. An Intra-LAN network message traffic authorization unit 312 allows only authorized communication between the plurality of endpoint devices of the shared VLAN environment. For example, it may block unauthorized communication between endpoints. A baseline traffic profiling unit 315 may be optionally included to develop a baseline profile for typical or normal intra-LAN message traffic patterns between endpoint device 120. For example, the presence of ransomware may generate unusual amounts or types of traffic in comparison to a baseline profile. An Intra-LAN ransomware attribute detection unit 320 determines if one or more intra-LAN messages have computer code indicative of ransomware, such as computer code files to implement file scanning and encryption.

In the example of FIG. 3, the security appliance includes an endpoint quarantine unit 315 to quarantine compromised endpoints. This may include, for example, generating a list of quarantined endpoint devices that are used to block intra-LAN communication for compromised devices (i.e., to stop the lateral movement of ransomware). An alert unit 320 may be included to generate automated alerts, such as generating alerts for an administrator of an attempted ransomware attack. An optional security escalation unit 325 may be included to implement a security escalation protocol to increase security.

It will be understood that while the security appliance 150 may be deployed on an existing VLAN system, in some implementations it may also be incorporated into new VLAN system components, such as being incorporated into an access port or a trunk port.

Figure 4:
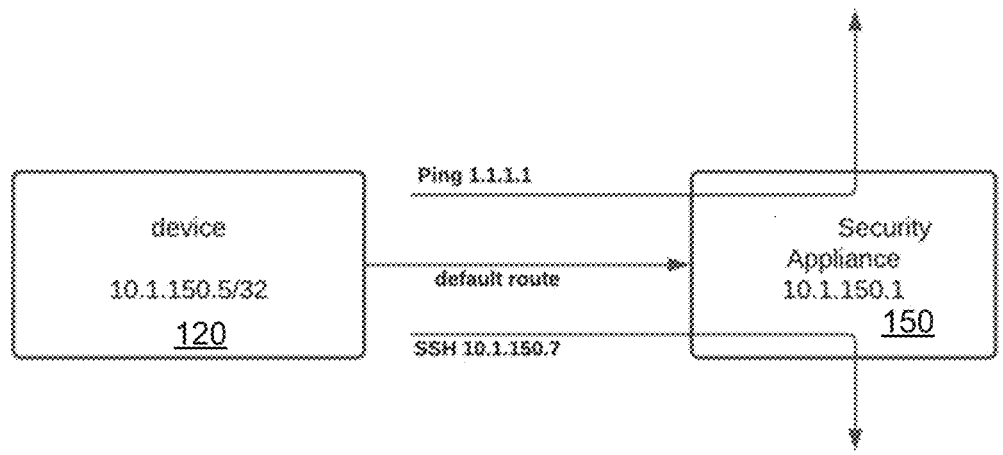
FIG. 4 illustrates the security appliance set as the default gateway in accordance with an implementation.

From the perspective of the endpoint 120, other endpoints and applications appear to be in a different IP network. Hence all outbound packets are sent to the default gateway as shown in FIG. 4. In this example, a /32 subnet is illustrated. However, more generally, a /31 or a /30 subnet may be used. Configuring a /32 subnet mask on endpoints forces all outbound network traffic via the security appliance 150. The security appliance 150 allows only authorized communication between endpoints, thereby significantly reducing the attack surface and lateral propagation by malware and ransomware. Detecting attempts by malicious actors to circumvent the protection provided by the security appliance permits quarantining devices which attempt to do so. Rapid quarantining of compromised endpoint devices stops the lateral propagation of ransomware. This, in turn, reduces the spread and potential damage of a ransomware attack.

Figure 5:
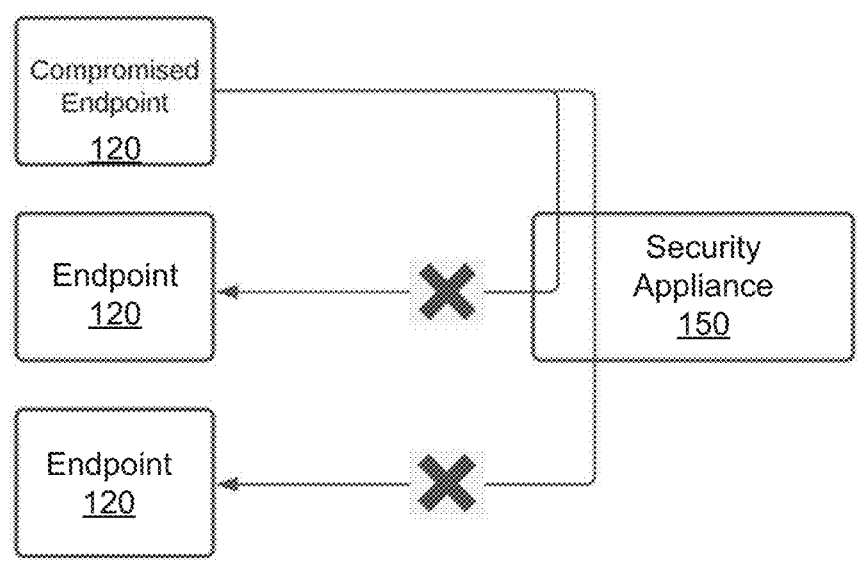
FIG. 5 illustrates how a security appliance may quarantine a compromised endpoint in accordance with an implementation.

FIG. 5 is a high-level block diagram illustrating an example of how lateral propagation of ransomware is prevented in accordance with an implementation. In this example, a compromised endpoint is infected with ransomware. The ransomware may, for example, have entered the compromised endpoint in a variety of different ways, such as through a peripheral IoT device in communication with the compromised endpoint.

Regardless of how the compromised endpoint became infected with ransomware, the security appliance 150 was earlier set as the default gateway. The security appliance 150 monitors message traffic and quarantines suspicious traffic from the compromised endpoint to other endpoints. This may include, for example, detecting message traffic that has attributes associated with ransomware, such as computer code for file scanning or encryption. It may also optionally include, in some implementations, detecting that message traffic that is unusual in comparison to a baseline profile of normal message traffic.

It is possible that ransomware in a compromised endpoint may attempt to directly communicate with another endpoint and bypass the security appliance 150. However, such an attempt to circumvent the security appliance 150 may still be detected and prevented.

Figure 6:
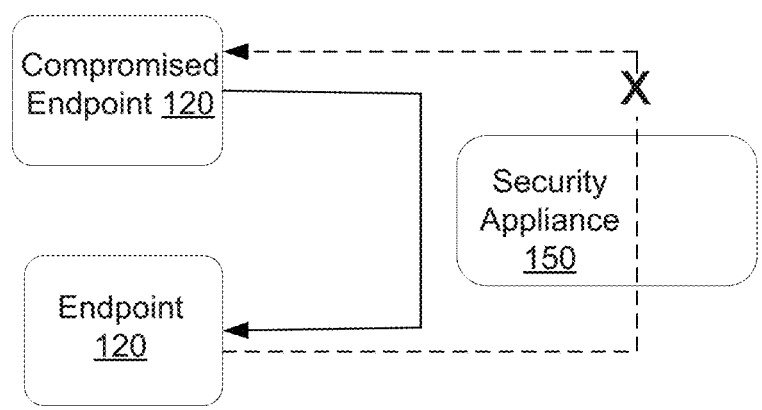
FIG. 6 illustrates how the security appliance may detect compromised endpoints attempting to circumvent the security appliance in accordance with an implementation.

FIG. 6 illustrates an example of how attempts to circumvent protection are detected. A compromised endpoint might, for example, have code in the ransomware that attempts to directly send request messages to another endpoint, bypassing the security appliance 150. However, an uncompromised endpoint will attempt to send its response message to the security appliance 150 as the default gateway. The security appliance 150 determines when it has detected a response from an endpoint directed to another endpoint but for which it has not detected a corresponding request. This discrepancy (a response message but no request message) may be used to identify that a compromised endpoint is attempting to circumvent the protection of the security appliance 150.

Figure 7:
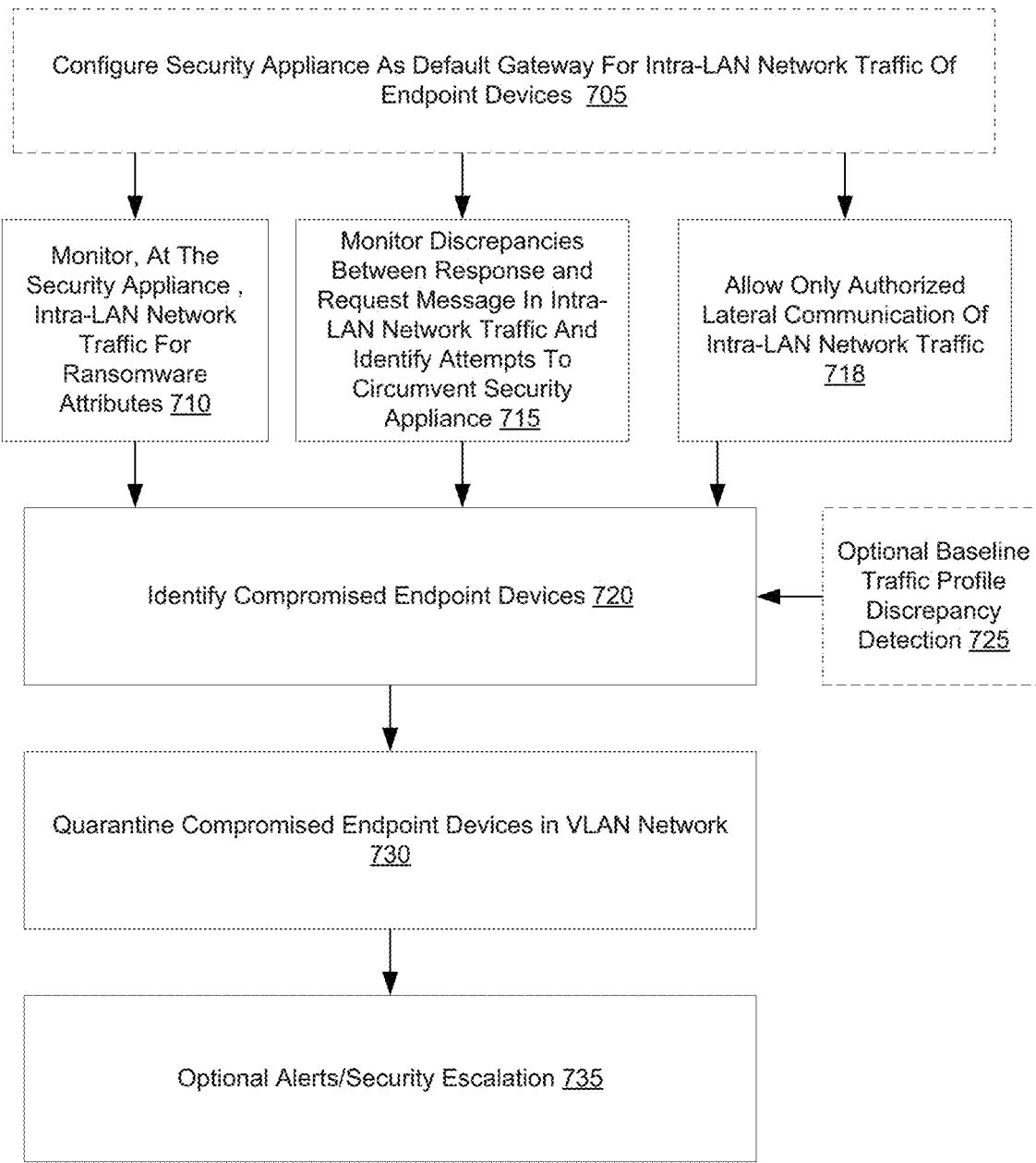
FIG. 7 is a flow chart of an example method for ransomware protection in accordance with an implementation.

FIG. 7 is a flow diagram of a method in accordance with an implementation. In block 705, a security appliance is configured as the default gateway for Intra-LAN network traffic of endpoint device. In block 710, the security appliance monitors intra-LAN network traffic for ransomware attributes. In block 715, the security appliance also monitors the intra-LAN message traffic for discrepancies between response and request messages in intra-LAN network traffic and identify attempts to circumvent the security appliance. In block 718, the method also includes the security appliance allowing only authorized lateral communication of Intra-LAN network traffic. In block 720, compromised endpoint devices are identified based on the outputs of blocks 710 and 715. Optionally, discrepancies with respect to a baseline message traffic profile from block 725 may be considered as an additional factor. In block 730, compromised endpoint devices are quarantined. This may include, for example, placing them on a list of quarantined devices, blocking communication with them, or taking other measures to isolate them. In block 735 optional alerts or security escalation may be performed. Security escalation could, for example, include implementing a security protocol to take a further action to mitigate or minimize the risk of further damage from a ransomware attack.

The security appliance 150 restricts communication in a manner that significantly reduces the attack surface available to the ransomware to exploit vulnerabilities in other endpoints and/or applications and propagate laterally. It detects attempts to circumvent the protection provided by the security appliance. If a compromised endpoint attempts to bypass the default gateway and tries to laterally propagate to another device, this attempt would be detected by the security appliance and appropriate action would be taken. This detection is because the uncompromised endpoint would still send the response packets to the compromised endpoint via the security appliance 150 (due to the /32 default route). The security appliance 150 detects the fact that it has seen a response packet to a request sent by the compromised endpoint, and it alerts the operator in this case. Automatic actions may be taken by the security appliance 150 including quarantining the compromised endpoint so that further lateral propagation is impossible.

Alternate Embodiments

Other implementations of one or more of these aspects include corresponding systems, apparatus, and computer programs, configured to perform the actions of the methods, encoded on computer storage devices.

These and other implementations may each optionally include one or more of the following features.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method of ransomware protection in a Virtual Local Area Network (VLAN), comprising:
    deploying a security appliance in an access or a trunk port of a shared VLAN environment;
    using a subnet mask of 255.255.255.255 to set the security appliance as a default gateway for a plurality of endpoint devices of the shared VLAN environment;
    monitoring, by the security appliance, intra-VLAN communication between the plurality of endpoint devices of the shared VLAN environment; and
    detecting, by the security appliance, lateral propagation of ransomware between endpoint devices via intra-VLAN communication in the shared VLAN environment.

2. The computer-implemented method of claim 1, further comprising: allowing, by the security appliance, only authorized communication between the plurality of endpoint devices of the shared VLAN environment.

3. The computer-implemented method of claim 2, wherein the security appliance blocks unauthorized communication between the plurality of endpoint devices of the shared VLAN environment.

4. The computer-implemented method of claim 1, further comprising: quarantining an endpoint device compromised by ransomware.

5. The computer-implemented method of claim 4, wherein the quarantining comprises blocking intra-VLAN communication of the compromised endpoint device.

6. The computer-implemented method of claim 1, wherein the detection comprises detecting a message attribute of a message originating from an endpoint device indicative of ransomware.

7. The computer-implemented method of claim 6, wherein the message attribute comprises file scanning code or file encryption code.

8. The computer-implemented method of claim 6, wherein the detection comprises detecting an attribute of message traffic, relative to a baseline profile of message traffic, indicative of an attempt to laterally propagate ransomware.

9. The computer-implemented method of claim 1, wherein the detection comprises: detecting a response message from a first endpoint device to a second endpoint device not having a corresponding request message from the second endpoint device pass through the security appliance.

10. The computer-implemented method of claim 1, further comprising generating an alert in response to detecting an attempt of a compromised endpoint device to laterally propagate ransomware via intra-VLAN communication.

11. The computer-implemented method of claim 1, further comprising initiating an enhanced security measure in response to detecting an attempt of a compromised endpoint device to laterally propagate ransomware via intra-VLAN communication.

12. A computer program product for ransomware protection in a Virtual Local Area Network (VLAN) comprising computer program instructions, which when executed on a processor implement a method, comprising:
   deploying a security appliance in an access or trunk port of a shared VLAN environment;
   using a subnet mask of 255.255.255.255 to set the security appliance as a default gateway for a plurality of endpoint devices of the shared VLAN environment;
   monitoring, by the security appliance, intra-VLAN communication between the plurality of endpoint devices of the shared VLAN environment; and
   detecting, by the security appliance, lateral propagation of ransomware between endpoint devices via intra-VLAN communication in the shared VLAN environment.

13. A Virtual Local Area Network (VLAN) system, comprising:
   a VLAN apparatus of a VLAN access or trunk port, the VLAN apparatus including a security appliance configured as a default gateway for intra-VLAN communication of a plurality of endpoint devices using a subnet mask of 255.255.255.255;
   the security appliance configured to monitor intra-VLAN message traffic, allow only authorized intra-VLAN communication and detect lateral propagation of ransomware between endpoint devices via intra-VLAN communication in a shared VLAN environment.

14. The VLAN system of claim 13, wherein the VLAN apparatus comprises an access port.

15. The VLAN system of claim 14, wherein the security appliance includes computer program instructions stored on a memory associated with the access port and executable on a processor associated with the access port.

16. The VLAN system of claim 13, wherein the VLAN apparatus comprises a trunk port.

17. The VLAN system of claim 16, wherein the security appliance includes computer program instructions stored on a memory associated with the trunk port and executable on a processor associated with the trunk port.

18. A computer-implemented method of ransomware protection in a Virtual Local Area Network (VLAN), comprising:
   deploying a security appliance in an access or a trunk port of a shared VLAN environment;
   using a subnet mask of 255.255.255.255 to set the security appliance as a default gateway for a plurality of endpoint devices of the shared VLAN environment;
   monitoring, by the security appliance, intra-VLAN communication between the plurality of endpoint devices of the shared VLAN environment;
   detecting, by the security appliance, attributes of intra-LAN messages indicative of lateral propagation of ransomware between endpoint devices via intra-VLAN communication in the shared VLAN environment;
   identifying attempts by individual endpoint devices to circumvent the security appliance by identifying response messages passing through the security appliance not having corresponding request messages;
   allowing, by the security appliance, only authorized communication between the plurality of endpoint devices of the shared VLAN environment; and
   quarantining an endpoint device compromised by ransomware by blocking intra-VLAN communication of the compromised endpoint device.

19. The computer-implemented method of claim 18, wherein the detecting comprises detecting message attributes associated with file scanning code or file encryption code.

20. The computer-implemented method of claim 18, wherein the detecting comprises detecting an attribute of message traffic, relative to a baseline profile of message traffic, indicative of an attempt to laterally propagate ransomware.

21. The computer-implemented method of claim 18, wherein the detecting comprises: detecting a response message from a first endpoint device to a second endpoint device not having a corresponding request message from the second endpoint device pass through the security appliance.

* * * * *